Figures 1, 2:
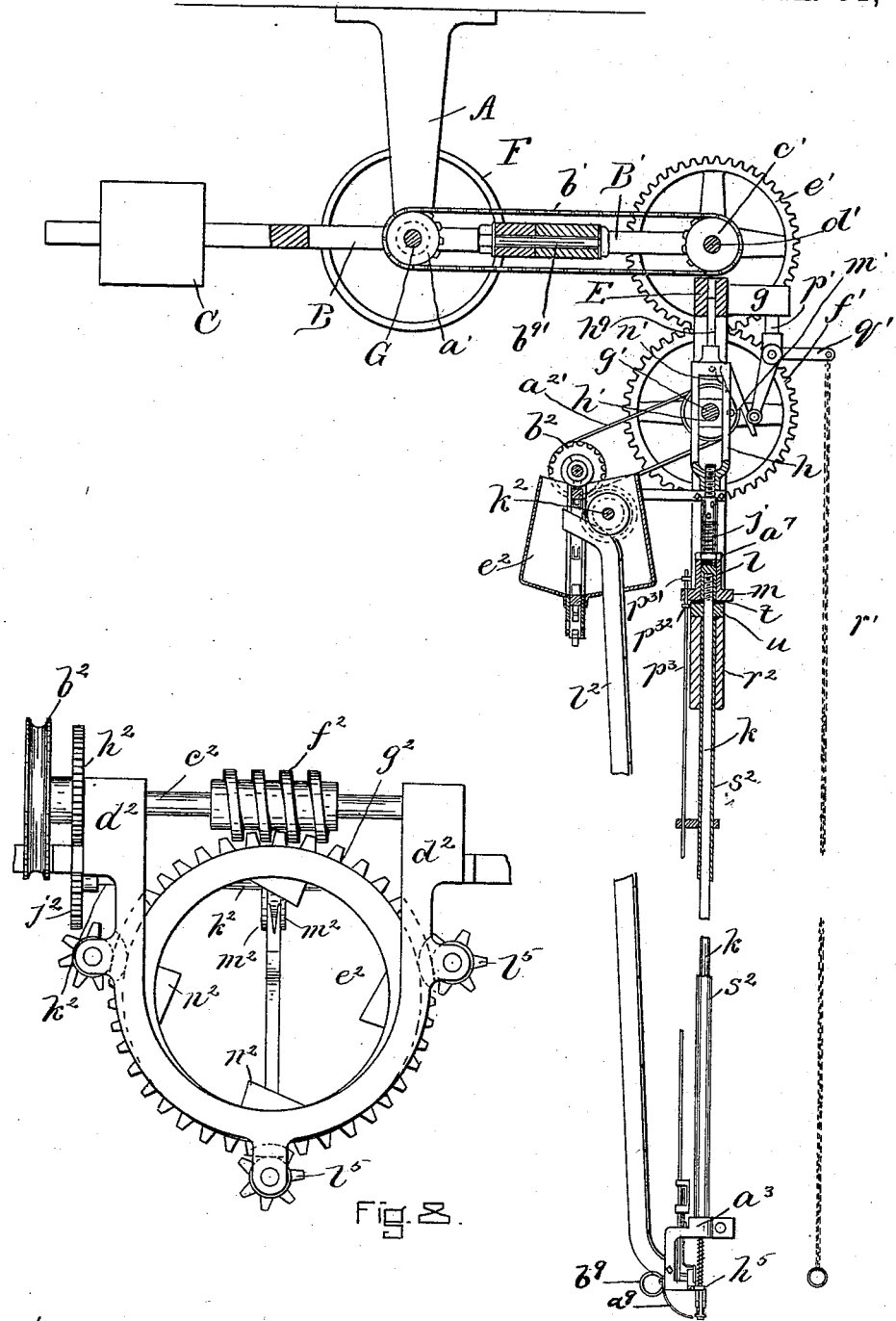

(No Model.)  3 Sheets—Sheet 1.

F. G. ROBBINS.
TACKING MACHINE.

No. 490,988. Patented Jan. 31, 1893.

WITNESSES.
Robert Wallace,
A. H. Morrison

INVENTOR.
Frank G. Robbins.
by Macleod Calver & Randall
his attys

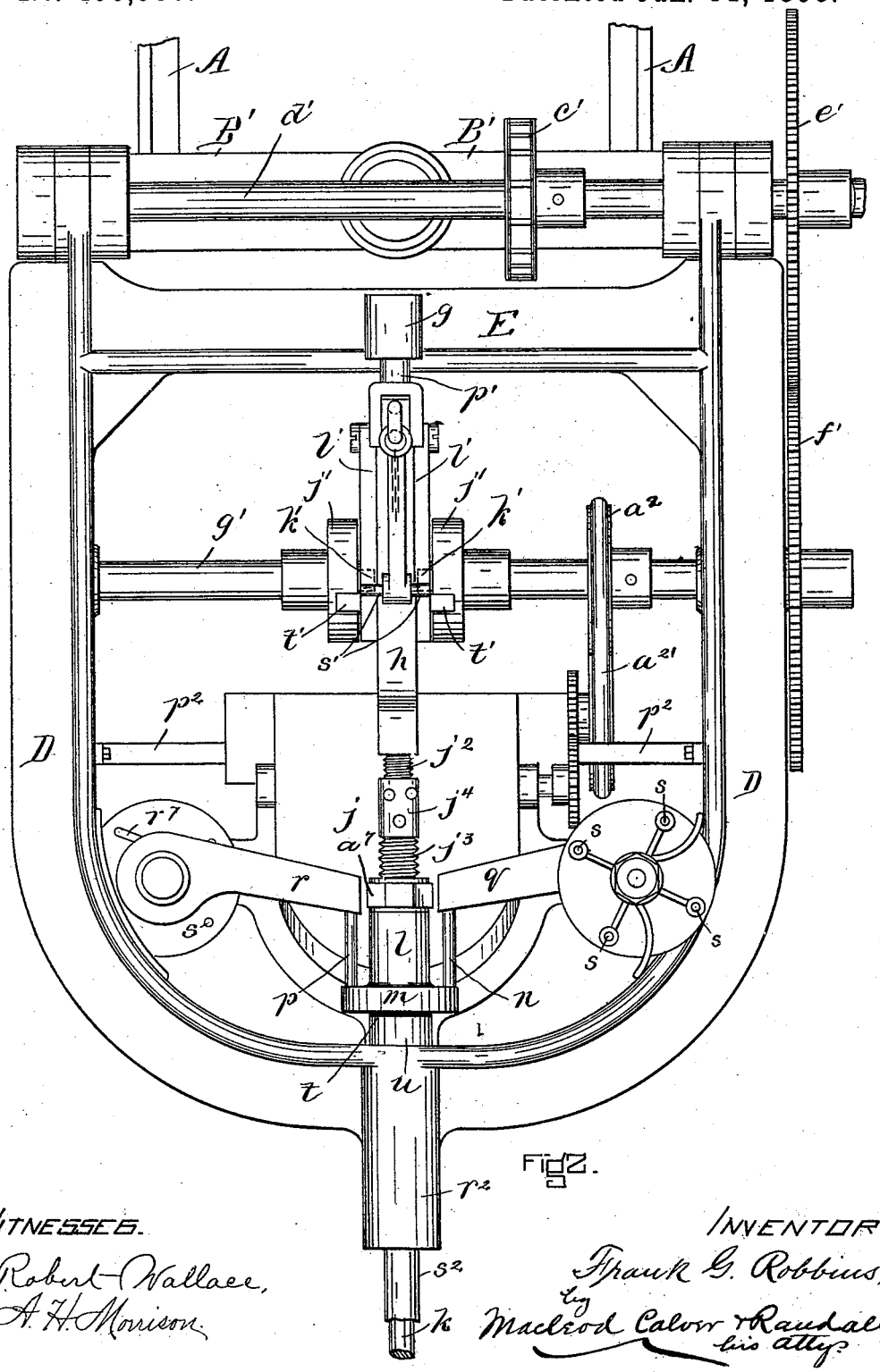

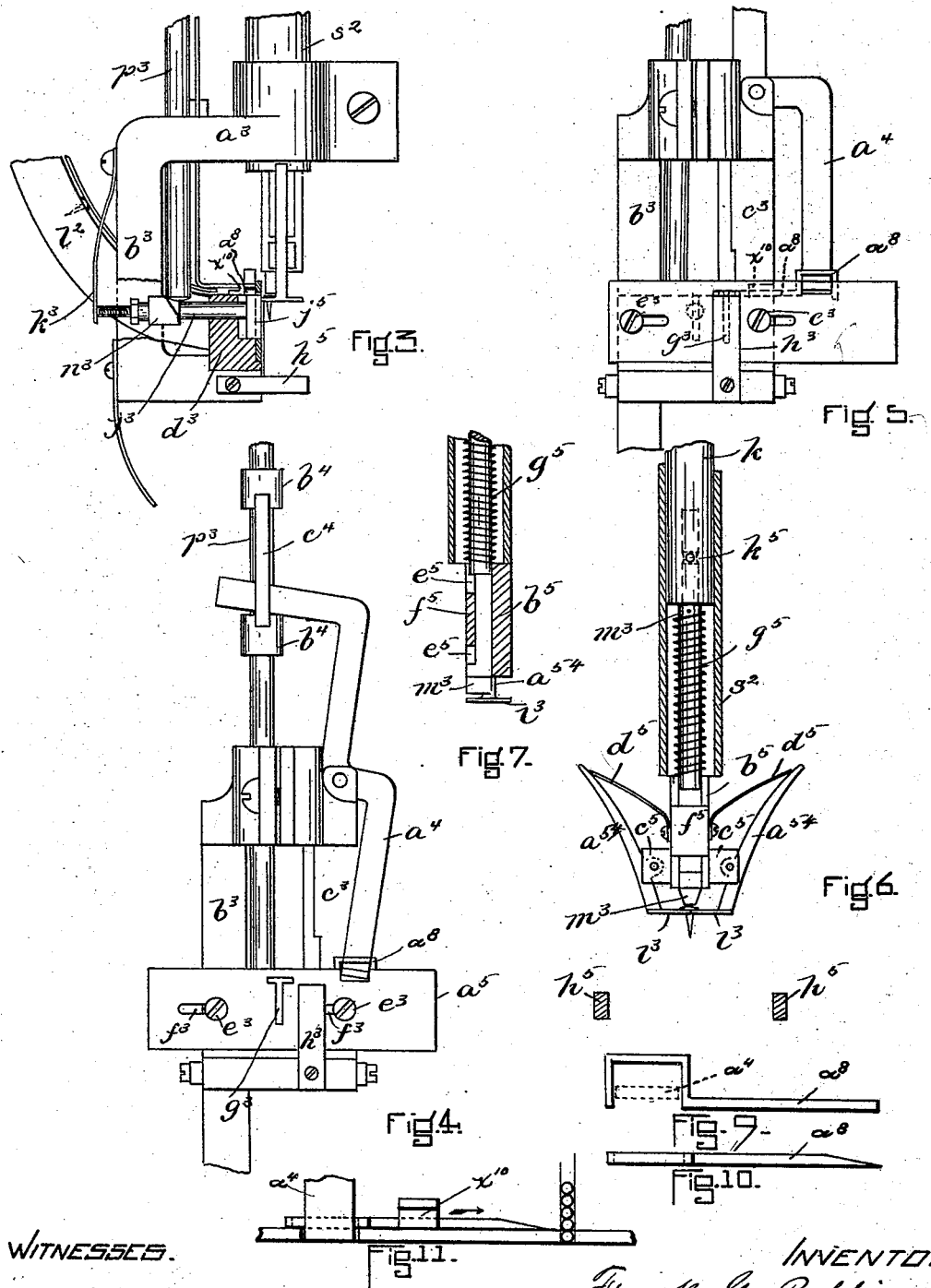

UNITED STATES PATENT OFFICE.

FRANK G. ROBBINS, OF HAVERHILL, ASSIGNOR OF ONE-HALF TO CHARLES H. KELLEY, OF REVERE, MASSACHUSETTS.

TACKING-MACHINE.

SPECIFICATION forming part of Letters Patent No. 490,988, dated January 31, 1893.

Application filed November 25, 1891. Serial No. 413,102. (No model.)

*To all whom it may concern:*

Be it known that I, FRANK G. ROBBINS, a citizen of the United States, residing at Haverhill, in the county of Essex and State of Massachusetts, have invented certain new and useful Improvements in Tacking-Machines, of which the following is a specification, reference being had therein to the accompanying drawings.

My invention has for its object to produce an automatic tacking machine which shall be efficient and speedy, and which may be readily controlled by the operator so that one tack only may be driven, or that an indefinite number of tacks may be driven in rapid succession.

The invention consists in an automatic tacking machine embodying certain new and improved features of construction, and novel and useful combinations and arrangements of parts, the said machine in its entirety comprising tack-feeding or delivering mechanism, transferring mechanism adapted to transfer tacks successively from the feeding or delivering mechanism to tack-holding mechanism, holding mechanism, tack-driving mechanism, a supporting frame for all these mechanisms which is mounted in such manner that it may easily be moved either vertically or laterally so that the tack may be driven where desired and so that the whole may be swung out of the way when not in use, and actuating devices whereby all the foregoing mechanisms are properly operated.

The invention will first be described with reference to the accompanying drawings, in which the same letters of reference designate the same parts in all the figures, and then will be distinctly defined and particularly pointed out in the claims which are appended hereto.

In the drawings, Figure 1 is a sectional side elevation of a machine constructed in accordance with my invention. Fig. 2 is an enlarged detail view in front elevation showing mainly the devices which operate and control the tack-driver. Fig. 3 is a detail view showing in side elevation, partly in section, the lower end of the race-bar containing the raceway for the tacks and the transferring, holding and driving mechanisms. Figs. 4 and 5 are detail views showing the transferring mechanism in different positions. Fig. 6 is a detail view, partly in section, showing the driver and holder and certain co-operating parts. Fig. 7 is a sectional view showing the lower portion of the driver and the parts adjacent thereto. Fig. 8 is a detail view of the tack-feeding or delivering mechanism. Figs. 9 and 10 are a side view and a plan view, respectively, of the separator $a^8$. Fig. 11 is a detail view of the said separator and adjacent parts.

Tacking machines are frequently used in the manufacture of boots and shoes, as for example, in the lasting of shoes. When machines are used for this purpose it is desirable that the parts of such machines should be so constructed and arranged that the tack-driving device may be changed in its location readily in order that the tacks may be driven in different parts of the shoe. It is also desirable that when the device is not in use it may be placed out of the way of the workman. I therefore mount the essential working parts of my machine on a frame which is hung and supported in a manner which permits the same to be swung freely in any direction, and raised or lowered out of and into working position all as and when desired. The said frame is marked D in the drawings. It is shown most clearly in Fig. 2, and is essentially U-shaped, the upper extremities of the arms thereof having holes therethrough to enable them to be fitted upon a horizontal transverse shaft $d'$ which is mounted in bearings at the forward ends of the arms of a yoke-shaped frame B' each of the said ends being forked so as to pass on both sides of the upper extremity of the corresponding arm of frame D. This mode of connection permits frame D to be swung forwardly and rearwardly as desired. By means of a horizontally arranged bolt $b^{91}$ passing through the rear portion of the yoke B', the latter is pivotally connected with the forward part or cross-piece of a frame B, this connection permitting the yoke B' and frame D to be swung laterally on the pivot constituted by the bolt $b^{91}$. The frame B has bearings therein for the reception of a horizontal transverse shaft G which is journaled in bearings at the lower ends of hangers A, the said frame B having a rearwardly extending portion or arm upon which is mounted a weight C intended to counterbalance the forward part of frame B and the parts applied thereto. This arrangement permits the frame D and parts mounted therein to be moved vertically as desired.

To the shaft G is fixed a band-pulley F and a sprocket wheel $a'$. A sprocket wheel $c'$ is fixed upon the shaft $d'$ and a chain $b'$ passing around the two sprocket wheels serves to transmit movement from the shaft G to the shaft $d'$. Upon the shaft $d'$ is fixed a gear wheel $e'$ meshing with a gear-wheel $f'$ on a shaft $g'$ which is journaled in bearings in the frame D and serves for the actuation of the essential working parts of the machine.

Brackets $p^2$ $p^2$ secured to the sides of the frame D support a hopper $e^2$ into which are thrown the tacks intended to be used. Into this hopper extends the upper end of the grooved race-bar $l^2$, the lower end of which extends to the point at which the tacks which have been placed in the groove of the said race-bar, and have slid down the same, are taken successively and driven into the work. A ring $g^2$ see Fig. 8, is placed transversely of the hopper $e^2$ and in a plane at right angles to the upper end of the race-bar, it rotating around the said end, and being provided on its interior with buckets or projections $n^2$ for the purpose of carrying the tacks up from the bottom of the hopper and dropping them upon the grooved upper side of the upper end of the race-bar, and on its exterior with teeth with which meshes the thread of a worm $f^2$ on a shaft $c^2$. The ring $g^2$ is supported by being mounted between pinions $l^5$ which are journaled in the hopper-frame $d^2$. The shaft $c^2$ is journaled in the portions $d^2$ of the hopper-frame $e^2$ and carries a pulley $b^2$ around which, and a pulley $a^2$ on the shaft $g'$ passes an endless band $a^{21}$. A gear wheel $h^2$ on the shaft $c^2$ meshes with a gear wheel $j^2$ fixed on a shaft $k^2$ which is journaled in the hopper-frame and carries two clearer wheels $m^2$ provided with fingers or projections on their peripheries which serve to knock off the tacks which are not started properly in the groove or race-way of the race-bar, there being one of these wheels disposed on each side of the race-bar. At the lower end of the race-bar $l^2$ is a cross-bar $d^3$ which is supported by two rearwardly and downwardly projecting arms $b^3$ $c^3$, the latter forming part of a frame $a^3$, see Figs. 3, 4, and 5 which is provided with a split collar that is fitted and clamped upon the lower end of a sleeve $s^2$, the latter being fitted at its upper end to the interior of the tubular boss $r^2$ formed at the lower part of the frame D. The lower end of the race-bar $l^2$ passes through the cross-bar $d^3$, from the rear to the front thereof, and the grooved path down which the tacks pass terminates adjacent to the carrier $a^5$. The said carrier is formed as a plate fitted to slide against the face of the cross-bar $d^3$, it being made with slots $f^3$ $f^3$ through which pass screws $e^3$ $e^3$ that serve to hold it to the face of the cross-bar. The carrier is formed with a T-shaped slot $g^3$ through the same, and into the T-shaped slot passes the bottom tack in the groove of the race-bar. The purpose of the carrier is to receive the tacks as they successively come to the bottom of the raceway, and transfer them to the holding devices which will be hereinafter described and which hold the tack until it is driven.

In front of the carrier is secured a shield $h^3$ which prevents the tack which has passed into the slot $g^3$ from being forced out of the front of the slot by the pressure of the tacks behind it. When the carrier has been moved along to transfer the tack which has entered the slot $g^3$ the rear side thereof closes the end of the race-way and retains the tacks therein in position until it moves back, whereupon as the slot $g^3$ is again presented in line with the race-way another tack is forced into the said slot. The carrier $a^5$ is engaged by one end of a lever $a^4$ and operated thereby. The upper end of this lever $a^4$ enters between two collars $b^4$ $b^4$ which are fixed upon a vertically reciprocating rod $p^3$ the lower end of said rod sliding in a hole in frame $a^3$, and the said collars being connected by a bar $c^4$ which fits outside the lever $a^4$. As the rod $p^3$ moves up and down, the collars $b^4$ $b^4$ thereon alternately act against lever $a^4$ to move the same on its pivot on the frame $a^3$ and slide the carrier backward and forward in front of the cross-bar $d^3$. A separator or pointed finger $a^8$ is secured near the lower end of the actuating lever $a^4$ and projects along the rear side of the carrier so that as the carrier begins to move the point of the separator will be thrust between the lowermost tack remaining in the race-way and the tack in the slot $g^3$ of the carrier, and will act to press or wedge back the tacks in the raceway, thus keeping them in proper position. This is desirable, since sometimes the lowermost tack in the raceway will ride over the tack in the carrier and so get partially into the carrier and unless thrust back will sometimes interfere with the operation of the machine. Through the cross-bar $d^3$ is fitted to slide a pin $j^3$ the outer end of which is acted upon by a spring $k^3$ which tends to press the pin $j^3$ forward. On the said pin $j^3$ is fitted a block $n^3$ having a beveled face, and also a face-plate $j^5$ which is adapted to enter the slot $g^3$. When in the movement of the carrier $a^5$ the slot $g^3$ is presented in front of the said face-plate $j^5$ the latter is forced into the slot by the action of the spring $k^3$, it ejecting from the said slot the tack which is therein held. The face-plate $j^5$ is withdrawn from the slot $g^3$ by the action of the lower end of rod $p^3$ against the inclined face of block $n^3$ in the descent of said rod. The length of the opening between the collars $b^4$ $b^4$ between which the upper end of lever $a^4$ works is such as to permit the rod to move downward a distance sufficiently to withdraw the face-plate $f^5$ before the lever $a^4$ and the carrier are moved.

The pin $j^3$ and the face-plate $j^5$ constitute what may be termed a pusher. As a tack is forced out of slot $g^3$ by the pusher it passes between the adjacent faces of holders $l^3$ $l^3$ which are carried by levers $a^{54}$ $a^{54}$, these levers being pivoted to lugs $c^5 c^5$ on opposite sides of a small frame $b^5$, and being acted upon by springs $d^5$ $d^5$ which force the holders toward each other. The opening between the holders $l^3$ $l^3$ into which the tack is pushed from the slot $g^3$ flares slightly at the rear side of the holders, that is at the edge next to the carrier, so that as the tack is pushed forward out of the slot $g^3$ in the carrier it readily forces the holders apart and may thus be pushed to its place between the same. The holders bear against the sides of the tack underneath the head thereof and hold it in a vertical position. The tack thus held between the holders $l^3$ $l^3$ is driven into the work by means of a tack driver $m^3$. The upper end of the stem of this driver enters a hole formed in the lower end of a driver-bar $k$ which is contained within the sleeve $s^2$, the said upper end being formed with a circumferential groove into which enters the pin $k^5$ which passes through the rod $k$, this connecting the driver and the driver-bar together and permitting the driver bar to be rotated with reference to the driver. At its upper end the driver bar $k$ is screw-threaded and fits within a screw-threaded socket in the lower end of a screw $j$. The latter has an upper screw-threaded portion $j^2$ and a lower screw-threaded portion $j^3$ on its exterior. The former enters the screw-threaded lower end of a yoke $h$, and the latter fits within the interiorly threaded sleeve $l$. The slotted portion of the yoke has fitted within the same a block $h'$ through which passes the shaft $g'$, the said block serving to steady the yoke and driver bar as they are moved up and down. A pin on stem $h^9$ on the upper end of the yoke slides in a hole formed in the cross-bar E at the upper end of frame D.

To the upper end of the yoke $h$, and on opposite sides thereof, are pivoted arms $l'$ $l'$, the free depending ends of which are notched on their rear sides to form shoulders $m'$. On the shaft $g'$ at each side of yoke $h$ is fixed a wheel $j'$ having a pin $k'$. A projection $g$ extending forward from cross-bar E has a downwardly extending arm $p'$ to which is pivoted a bell-crank $q'$, the vertical arm of which is provided with laterally projecting pins $s'$ $s'$ adapted to be caused to bear against the arms $l'$ $l'$. From the horizontal arm of bell-crank $q'$ hangs a chain $r'$ which falls within reach of the operator. When the latter grasps the chain and pulls down upon it so as to rock the bell-crank $q'$ the pins $s'$ $s'$ press the arms $l'$ $l'$ back so that the pins $k'$ on the wheels $j'$ $j'$ may engage with the shoulders $m'$, whereupon the yoke and connected driver-bar and driver are raised. As soon, however, as lugs $t'$ $t'$ upon the arms $l'$ $l'$ come in contact with the peripheries of the wheels $j'$ $j'$ the shoulders $m'$ are disengaged from the pins $k'$ $k'$ and the yoke and connected parts are free to descend. The yoke and driver bar and driver, are forced downward after the disengagement of the shoulders $m'$ $m'$ from the pins $k'$ $k'$ by means of spring actuated arms $q r$ bearing upon pins $n p$ on the flange $m$ of the sleeve $l$, the said arms serving to impart the movement which causes the driver to force the tack into the work. A cushion formed by a washer $t$ of elastic material is placed upon the boss $u$ of frame D to receive the impact of the blow of the sleeve $l$ in its descent. The arms $q$ $r$ are acted upon by coiled springs $r^7$, the tension of which may be varied as desired by shifting the free ends of the said springs from one to another of the holes $s$. The lower end of the driver passes through the block $b^5$, as shown clearly in Figs. 6 and 7, and the face-plate $f^5$ of the said block is located between the shoulders at the end of the driver. A spring $g^5$ surrounds the stem of the driver and is connected at its upper end with the said stem and at its lower end with the block $b^5$, the said spring acting to draw the said block upwardly. Normally the block is held by the spring in contact with the lower end of sleeve $s^2$ as in Figs. 6 and 7. When the parts are in the position in which they are represented in the said figures, there is just sufficient space between the holders $l^3$ $l^3$ and the lower end of the driver $m^3$ to admit the head of a tack. The extent of this space will be varied by turning the screw $j$ so as to cause it to pass up into or down out of the yoke $h$. In the rotation of the said screw, as the threaded portion $j^2$ is turned into or out of the threaded portion of the yoke, the threaded portion $j^3$ is turned to the same extent into and out of the sleeve $l$, and hence no vertical change in the position of the said sleeve occurs. A lock-nut $a^7$ above the sleeve $l$ prevents the latter from becoming accidentally displaced in position. Through the flange $m$ of the sleeve $l$ passes loosely the upper end of the rod $p^3$, collars or nuts $p^{31} p^{32}$ being placed on the said rod above and below the said flange in order that the latter as it moves up and down may communicate movement to the rod and thereby occasion the action of the parts which are operated from the rod $p^3$. After chain $r'$ has been drawn upon by the operator to turn the bell-crank $q'$ and move the arms $l'$ into position to be engaged by the pins $k'$ $k'$ on the wheels $j'$ $j'$ and after the yoke and connected parts have been raised in consequence of this engagement and become disengaged, the yoke driver-bar and driver are forced downward by the action of the spring pressed arms $q$ $r$. At the commencement of the downward movement of these parts the block $b^5$ is drawn up against the lower end of the sleeve $s^2$ by the tension of spring $g^5$, and it remains bearing against the same until the end of driver $m^3$ takes good bearing against the head of the tack after which the frame $b^5$ and holders $l^3$ $l^3$ descend toward the work in unison with the driver. The work to be tacked is placed below the tacking devices which are then brought down upon it until the gage $a^9$ see Fig. 1, comes in contact with the work; the tack may then be driven. This is effected by pulling the chain $r'$ as previously explained. After the driver and holders have been forced downwardly until the tack has been well entered into the work the holders are separated by reason of the pivoted arms $a^{54}$ coming in contact with the wings $h^5$ and the head of the tack is freed. The further downward movement of the driver forces the tack home. The gage $a^9$ referred to consists of a curved arm which is firmly secured to the lower portion of the frame $a^3$ and in such manner that it may be adjusted with reference thereto, that is so that the lower end of the gage may be slightly raised or lowered relatively to said frame $a^3$.

For greater convenience in handling my machine I provide a handle $b^9$ which is preferably of the ring shape shown and which is secured to the lower rear portion of the frame $a^3$; the precise shape of the handle as also the point at which it is secured to my machine, is not essential as different operators might prefer handles of different forms and located at different places. The handle is a convenience in guiding the machine. The operator may pass one or more of the fingers of his left hand through the ring $b^9$, placing the ring at the end of the chain $r^9$ on another finger. This enables him by the use of one hand to guide the machine and operate it while the other hand is free.

If my device is used in lasting, the right hand of the operator is free to be used in holding and manipulating the lasting pinchers.

I claim as my invention:—

1. The combination with a driving shaft, a counterbalanced frame pivoted to swing vertically concentrically with the axis of the said driving shaft, a yoke pivoted to the said counterbalanced frame to swing laterally thereon, a driven shaft journaled in bearings in the said yoke, driving connections whereby the said shaft is actuated from the driving shaft, a depending frame hung concentrically with the driven shaft, a hopper and race bar carried by the said depending frame, a tack-feeder for placing tacks contained in the hopper upon the race-bar, a transferring device at the delivery end of the race-bar for separating the tacks and transferring them to the tack-grasping device, a tack-grasping device, a spring actuated tack-driver, an actuating shaft mounted in bearings in the said driven frame and driven from the said driving shaft, a wheel carried by said shaft and provided with a projecting pin, a pivoted notched arm connected with the tack driver, means whereby said arm may be pressed into engagement with the said pin, and connections with the said actuating shaft through which the feeder, transferring device and grasping device are made operative, substantially as described.

2. The combination with the race-bar, of the carrier having the slot $g^3$ and located adjacent to the end of the race-bar, an operating lever for the said carrier, the spring-pressed pusher having a cam-piece connected therewith, and a reciprocating rod carrying collars or projections engaging said lever to move the carrier, the said rod also acting against the cam-piece to move the pusher oppositely to the spring, substantially as described.

3. The combination with the race-bar of the carrier having the slot $g^3$ and located adjacent to the end of the race-bar, the pusher, and devices for sliding the carrier across the end of the race-bar and actuating the pusher to eject a tack from the slot $g^3$, of the spring-pressed holders between which the tack is forced when it is ejected from the slot $g^3$, a spring supporting the said holders, a driver, means for actuating the driver, and holder-opening projections below the race-bar against which the arms of the holders are carried in the descent of the driver, substantially as described.

4. The combination with tube $s^2$, the driver-rod within said tube, the driver connected with the lower end of said driver-rod, and devices at the upper end of said driver-rod for actuating the said rod and driver, of the frame $f^5$, the spring connected with the said frame and tending to hold it against the lower end of the tube, the spring-pressed holders carried by the said frame, and the fixed projections against which the arms of the holders are carried in the descent of the driver and which serve to separate the holders, substantially as described.

5. The combination with the driver, the driver-bar, and a connected yoke, of a rotating wheel, carrying a pin or projection, a shouldered arm pivoted to the said yoke, means whereby the said arm may be pressed inward to occasion engagement between the shoulder and the projection or pin aforesaid, and a spring actuated arm or arms operating to depress the driver and connected parts after the shoulder has become disengaged from the pin or projection substantially as described.

6. The combination with a driver, a driver-rod screw-threaded at its upper end, the internally-threaded coupling screw $j$ having the external threaded portions $j^2$, $j^3$, the yoke $h$ fitted to portion $j^2$, the shouldered arm pivoted to the said yoke, a rotating wheel carrying a projecting pin adapted to engage with the shoulder when the arm is pressed toward the same, means for pressing inward the said arm when desired, a flanged sleeve fitted to the portion $j^3$ of the screw $j$, and a spring-actuated arm or arms acting against the flange of the sleeve, all substantially as described.

7. The combination with a driver, a driver-rod having a projection or flange moving therewith, and means for actuating said driver-rod and driver, of an actuating rod having nuts or stops thereon to be engaged alternately by the projection or flange as the said driver-rod reciprocates, collars or projections also carried by said actuating rod, a lever having one arm thereof disposed in position to be engaged by the said collars or projections alternately as the actuating rod is reciprocated, a transferring carrier receiving successive tacks of a series, a spring-pressed pusher for ejecting the tacks from the carrier and having a cam-piece adapted to be borne upon by the lower end of the actuating rod, and a tack-holder between the jaws of which the tacks are successively pushed, when ejected from the carrier by the pusher, and held in position to be acted upon by the driver, substantially as described.

In testimony whereof I affix my signature in presence of two witnesses.

FRANK G. ROBBINS.

Witnesses:
WM. A. MACLEOD,
ROBT. WALLACE.